INVENTOR.
LARRY F. SMREKAR

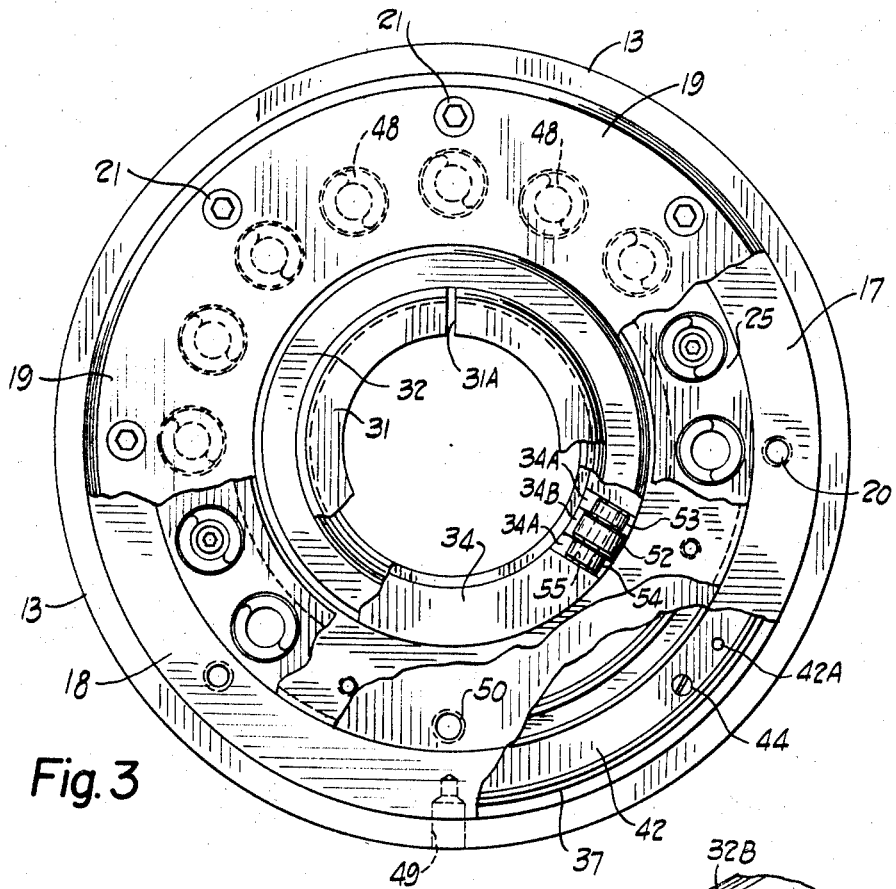
Fig. 3
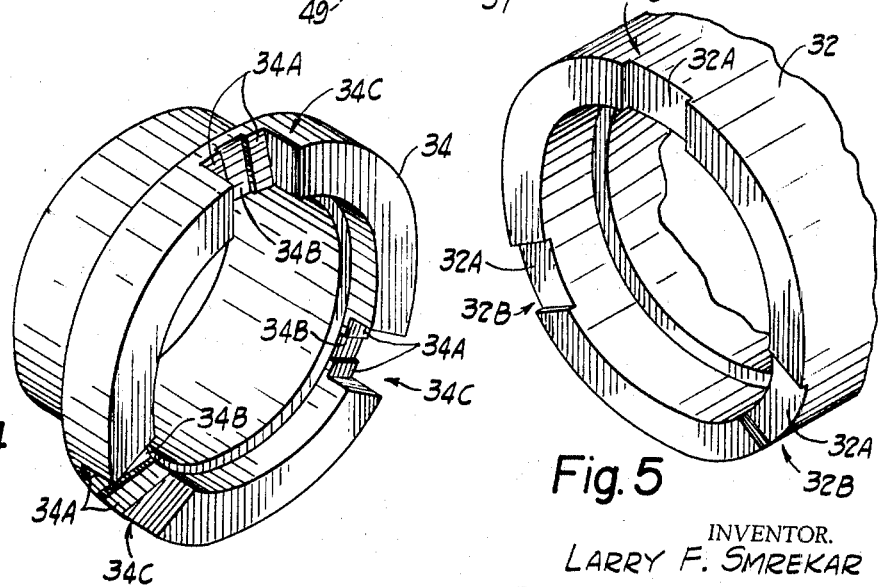
Fig. 4
Fig. 5
INVENTOR.
LARRY F. SMREKAR
ATTORNEYS.

United States Patent Office 3,434,730
Patented Mar. 25, 1969

3,434,730
COLLET MECHANISM
Larry F. Smrekar, 6604 Solon Road,
Solon, Ohio 44139
Filed Sept. 8, 1966, Ser. No. 578,016
Int. Cl. B23b *31/30, 31/10, 5/22*
U.S. Cl. 279—4                                14 Claims

ABSTRACT OF THE DISCLOSURE

A collet mechanism in which the collet-actuating sleeve is axially moved by springs in a direction to actuate the collet to holding position, in which fluid pressure means is provided to oppose the force of the springs to permit the sleeve to move in an opposite direction to permit the collet to move to releasing position, and in which there are rollers movable radially inward between camming surfaces to add to the force of the springs the mechanical advantage of the rollers moving between the camming surfaces, the operation of said fluid pressure means to oppose the force of said springs also permitting the rollers to move radially outward between said camming surfaces to subtract said mechanical advantage.

---

My invention relates to collet mechanisms such as used on lathes, screw machines and other machines requiring chucking or stock.

My invention is directed to a novel collet mechanism wherein the force utilized for actuating the collet to a holding or chucking position is obtained by resilient means augmented by mechanical-advantage means, and more particularly wherein the force of springs is utilized and the force of the springs is increased by a wedging action obtained through camming means and roller means.

An object of my invention is to obtain a strong and efficient chucking action in a collet mechanism, and which action is readily and quickly released by fluid pressure means such as obtained by a pneumatic piston and cylinder assembly.

Another object is the provision for greatly augmenting the force imposed by springs in a collet mechanism for actuating the sleeve that cooperates with the collet providing the chucking action.

Another object is the provision for combining resilient means, camming means and fluid pressure means in a unique combination for obtaining superior results and a novel manner of actuating a collet mechanism.

Other objects and a fuller understanding of this invention may be had by referring to the following description and claims, taken in conjunction with the accompanying drawings, in which:

FIGURE 3 is an end view, on a reduced scale, looking toward the left of the mechanism shown in FIGURES 1 and 2, that is toward the face of the collet mechanism;

FIGURE 4 is an enlarged perspective view of a ring member embodied in my collet mechanism and showing some of the wedge surfaces utilized; and FIGURE 5 is a perspective view of the end portion of the collet-actuating sleeve and showing other of the wedging surfaces.

Figure 1:
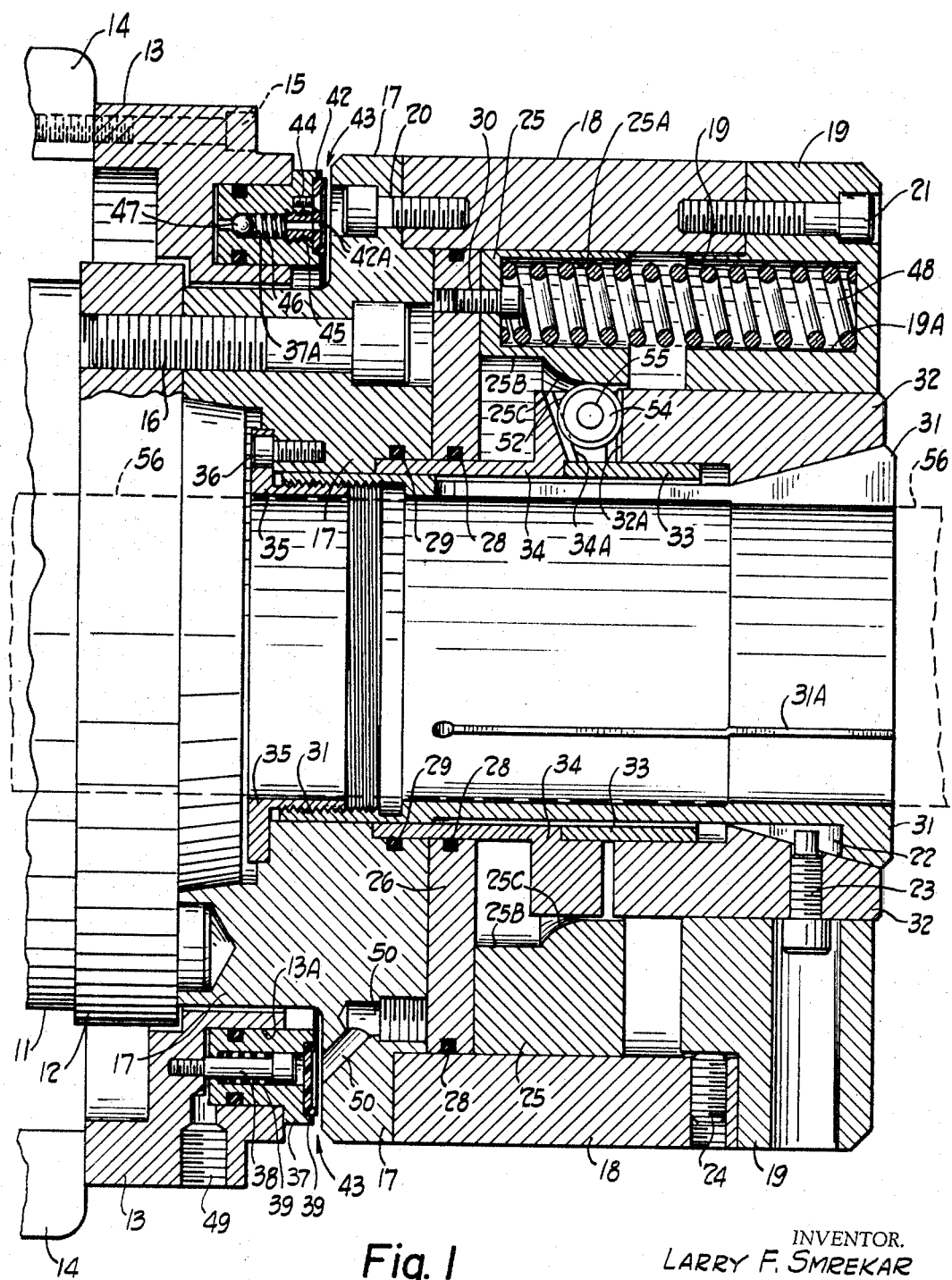
FIGURE 1 is a longitudinal sectional view taken axially through a preferred form of my collect mechanism, and showing the collet in its chucking or holding position.
Figure 2:
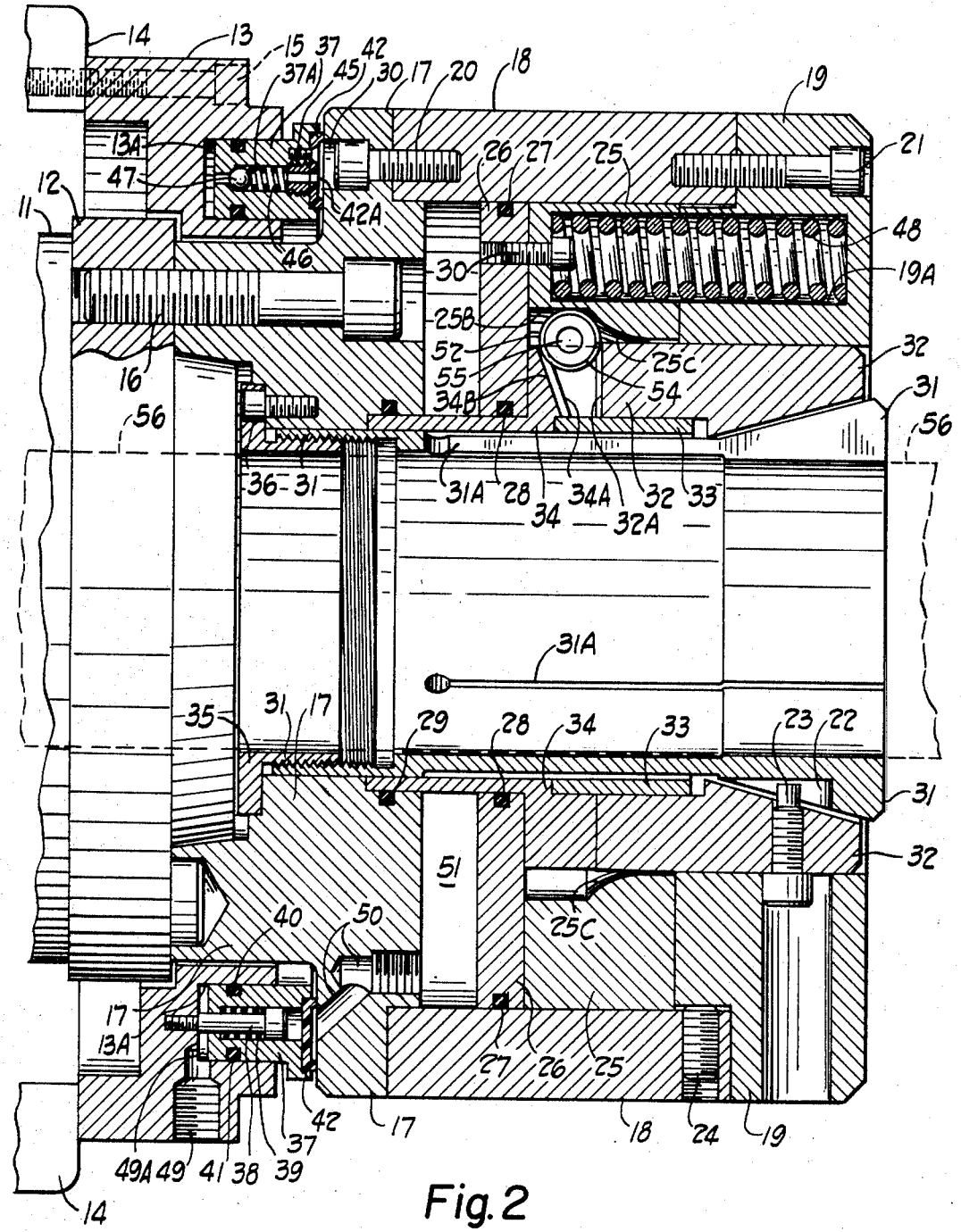
FIGURE 2 is a view similar to that of FIGURE 1 but shows the mechanism in position wherein the collet is in its released or non-grasping position.

In the present description which is directed to a preferred form of my collet mechanism, the right-hand end of the views of FIGURES 1 and 2 are referred to as the forward end and the left-hand end of the views are referred to as the rearward end. My collet mechanism has a shell member made up of an adapter ring 17, an outer cylinder 18 and a front plate 19. This shell member is secured by threaded bolts 16 to the flange 12 of the spindle 11 which rotates in a machine such as a lathe or screw machine. The mechanism also includes an annular gland housing 13 which is secured by four threaded bolts 15 to the end face 14 of a machine. As seen in FIGURES 1 and 2 the end face of the machine 14 and spindle 11 are shown broken away. Concentrically mounted within the shell member and spaced radially inward of the outer cylinder 18 is a collet-actuating sleeve 32. Concentrically mounted within the sleeve 32 is a collet 31 which has three fingers formed therein by the slots 31A equidistantly spaced around, the fingers being resilient as is usual for such collets. The collet 31 and the sleeve 32 adjacent their forward ends have cooperating camming surfaces so disposed that upon axial movement of the sleeve 32 in a forward direction the collet 31 is actuated to compress the forward ends of the fingers and thus to move the collet to chucking or holding position against stock indicated in broken lines and denoted by the reference character 56. Upon movement of the sleeve 32 rearwardly, the resilient force of the fingers of collet 31 urge the sleeve 32 rearwardly. In FIGURE 1 the collet 31 is shown compressed radially inward upon the stock 56 whereas in FIGURE 2 the collet 31 is shown in its released position so as to loosen its hold on the stock 56.

The collet 31 has a key way or slot 22 formed therein and a key pin 23 carried by the sleeve 32 permits a relative axial movement between collet 31 and sleeve 32 but prevents a rotation of the collet 31 relative to the sleeve 32. To aid in axially positioning the sleeve 32 within the front plate 19 there is provided four adjusting screws 24 equidistantly spaced therearound and which permits slight adjustment of the sleeve 32 relative to plate 19. Positioned axially within the shell member and in general axial alignment with the sleeve 32 is a ring member 34. The rearward end of the ring member 34 abuts against the adapter ring 17 and an O-ring 29 provides a seal between the adapter ring 17 and the ring member 34.

Positioned within the shell member is a piston made up of a toroidal piston 26 and a cam ring 25 bolted thereto by bolts 30, whereby the piston 26 and ring 25 move together in a axial direction.

The front plate 19 and cam ring 25 have axially aligned recesses formed therein, the ring member 25 being formed with fifteen recesses 25A and front plate 19 being provided with fifteen recesses 19A directly facing and aligned with the respective recesses 25A. Mounted within the aligned recesses 25A and 19A are coil springs 48 which are so biased as to resiliently urge a ring member 25 rearwardly and hence to urge the toroidal piston 26 rearwardly, that is toward its position shown in FIGURE 1. The springs 48, fifteen in number, are substantially equidistantly spaced around the circumferential extent of the shell member so as to distribute the resilient force thereof around the circumference of the mechanism.

Concentrically mounted within the extending between ring member 34 and sleeve 32 is an aligning sleeve 33. The rearward end of the aligning sleeve 33 abuts against the ring member 34 as illustrated. The sleeve 33 is secured to or otherwise held against the ring member 34 and hence the axial movement of the sleeve 32 is relative to the sleeve 33.

Within the shell member in advance of the adapter ring 17 and between the outer cylinder 18 and ring member 34 on one side of the piston 26 there is provided a chamber 51 adapted to receive fluid under pressure as for example compressed air. Around the maximum circumference of the piston 26 there is an O-ring 27 mounted in a groove provided for accommodating the same. Around the minimum circumferential surface of the piston 26 is an O-ring 28 in a groove provided for accommodating the same. The toroidal piston 26 moves forwardly and rearwardly between deposed walls of the cylinder 19 and the ring member 34. In FIGURE 1 the chamber 51 is at its minimum size and in FIGURE 2 the chamber 52 is at its maximum size.

Mounted within an annular groove 13A of the gland housing 13 is a gland member 37 of toroidal shape. The groove 13A faces forwardly and the gland member 37 is adapted to move forwardly and rearwardly within the groove 13A. Four bolts 38 secured to the gland housing 13 extend through four equidistantly spaced openings through the gland member 37. The heads of the bolts 38 make a sliding fit within the bores of the openings and thus the bolts 38 provide guides for the forward and rearward movement of the gland members 37 in the grooves 13A. Coil springs 39 around the shanks of respective bolts 38 are biased to urge the gland member 37 rearwardly, that is toward its position shown in FIGURE 1.

Secured to the forward face of the gland member 37 is an annular face seal 42, preferably made of Teflon or the like. The forward face of the seal 42 is somewhat concave as illustrated to provide two concentric lips extending therearound. In the forward position of the gland member 37 carrying the seal 42, the lips of the seal 42 sealingly engage the rearward face of the adapted ring 17 as shown in FIGURE 2. On rearward movement of the gland member 37 carrying the seal 42 the lips of the seal 42 are spaced from the rearward face of adapter ring 17 so as to leave an open space 43 therebetween, which open space 43 is open to atmosphere. The seal 42 is held to the forward face of the gland member 37 by eight equidistantly spaced screws 44. On diametrically opposite sides of the gland member 37 there are two openings extending therethrough in which ball check mechanisms are found. Each ball check mechanism comprises a ball 47 urged rearwardly against an internal seat by a small coil spring 46. The forward end of each coil spring 46 abuts against a threaded port member 45 threadably engaged in the gland member 37. There is a bore through the port member 45 and in alignment with the bore there is a hole 42A in the seal 42. Thus there are two passageways extending through the gland member from the rearward face thereof to the forward face and through the seal 42. The balls 47 are urged to initially resist movement of air or other fluid under pressure fowardly through the gland member but upon overcoming the resilient bias of the springs 46 air or other fluid under pressure may pass forwardly through the two bores so as to flow through the gland member and through the aligned openings 42A of the seal 42.

Extending radially of the gland housing 13 is an inlet 49 adapted to communicate with compressed air or other source of fluid under pressure. This inlet 49 communicates with an annular chamber 49A positioned rearwardly of the gland member 37 which in effect is a toroidal piston movable in a torodial chamber. Formed in the adapter ring 17 is a conduit 50 which has an initial portion of annular shape on the rearward face of adapter ring 17 and so positioned as to communicate with the two openings 42A in the seal 42 on movement of the gland member 37 to its closed position as in FIGURE 1. This conduit 50 extends radially inwardly and forwardly through the adapter ring 17 so as to communicate with the chamber 51 at the rearward side of the piston 26.

Upon initial admission of compressed air or other fluid under pressure through the inlet 49 such fluid first pushes the gland member 37 forwardly in the groove 13A so as to press the seal 42 in a tight seal against the adapter ring 17. This is the position illustrated in FIGURE 2. Thereafter by a build up of pressure back of the gland member 37 the balls 47 are moved forwardly against the bias of the springs 46 to admit air or fluid through the two bores in the gland member and hence through the two openings 42A in the seal 42. This air or fluid under pressure is thus admitted to the chamber 51 and its force urges and moves the piston 26 forwardly from its position in FIGURE 1 to its position shown in FIGURE 2. A seal is provided between the gland member 37 and its confining bore in which it reciprocates by two O-rings 40 and 41.

The rearward end of the collet 31 is held in position by a threaded adapter 35 which is threadably engaged to complementary threads on the collet 31. The adapter 35 in turn is held in position by a bolt 36 secured to the adapter ring 17. The front plate 19 is secured to the outer cylinder 18 by eight bolts 21 and the outer cylinder 18 in turn is secured to the adapted ring 17 by eight bolts 20.

The rearward end face of sleeve 32 is provided with three equidistantly spaced notches 32B and on the inner end face of each notch 32B is an end surface 32A disposed in a plane substantially normal to the axis of the sleeve 32. It is noted that this end surface 32A is indented from the rearward-most end of the sleeve 32. Each of these end surfaces 32A provides a wedging surface for a wedging action to be described.

The ring member 34 extends radially outward at its forward-most portion to be in substantial alignment with the sleeve 32. The ring 34 at this rearward-most portion is provided with three equidistantly spaced notches 34C. Each notch 34C is provided with a middle end surface 34B on each side of which are end surfaces 34A. In other words, each notch 34C has one end wall 34B and two walls 34A on opposite sides of the wall 34B. The wall 34B extends rearwardly more than do the two walls 34A as better seen in FIGURE 4. The walls 34A and 34B are disposed in planes which are inclined at an angle to the axis of the ring member 34 and extend forwardly and radially inward. It is thus seen that the opposed walls 32A and 34A converge as they extend radially inwardly. The walls 34A being inclined as shown provide wedging surfaces for a wedging action to be described.

Associated with each of the axially aligned notches 34C and 32B are roller devices. Each roller device is made up of a shaft 55 upon which is mounted a large middle roller 52 and two smaller or end rollers 53 and 54 on opposite sides of the large middle roller 52. Each of the rollers 52, 53 and 54 are independently revolvable around the shaft 55. Each roller device floats within the mechanism so as to be movable radially inward and outward between the opposed wedging surfaces described.

It is to be noted that the large middle roller rollingly engages the indented end surface 32A of its respective notch but does not engage the opposite surface 34B of the ring member 34. Thus as the large roller 52 rolls up and down on the surface 32A it does not have any engagement with the surface 34B. If it did engage the surface 34B it would be moving in an opposite direction at that surface and thus meet frictional resistance. However, by clearing the surface 34B the large roller 52 is free to rotate without such resistance.

It is also to be noted that the two end rollers 54 engage the surfaces 34A, respectively, but do not engage the end surface of the ring 32 thus the end rollers 53 and 54 may freely roll up and down the surface 34A without frictional resistance encountered with engagement of the sleeve 32. There is thus provided an efficient rolling action with a minimum of frictional resistance.

The ring 25 has a cylindrical inner surface 25B against which the roller device may move in its outermost position as in FIGURE 2. Extending forwardly and rearwardly inward from this cylindrical surface 25B is a camming surface 25C which slopes in a gradual curve as it moves radially inward and forwardly. The camming surface 25C extends circumferentially around the inner surface of the ring 25. As the piston 26 with the ring 25 secured thereto moves rearwardly under the force of the springs 48, the camming surface 25C rolls against and over the large middle roller 52 and thus forces the roller assembly radially downward between the opposed wedging surfaces described. There are three equidistantly spaced roller devices included and as all three are simultaneously moved radially inward between the opposed wedging surfaces described the sleeve 32 is forced forwardly relative to the collet 31 and thus actuates the collet 31 to its holding or chucking position against the stock 56. In FIGURE 1 the rollers are shown moved downwardly between the opposed wedging surfaces and held there by the camming surface 25C, which in turn is maintained in that position of FIGURE 1 by the resilient force of the springs 48. The camming and wedging action thus described provides a mechanical advantage means whereby the force exerted by the springs 48 is greatly increased and a greater force is imparted to the collet than would otherwise be obtainable by the spring alone.

When it is desired to release the collet so as to loosen its hold upon the stock 56 compressed air or other fluid under pressure is admitted to the inlet 49 which first moves the gland member 37 forwardly and subsequently is admitted through the holes 37A in the gland member 37 and holes 42A in the seal 42 into the conduit 50 and hence into the chamber 51. The force exerted by the compressed air or other fluid under pressure in the chamber 51 overcomes the resilient force of the springs 48 and moves the camming surface 25C from its rearward position in FIGURE 1 to its forward position in FIGURE 2. This permits the rollers to move radially outwardly from the wedging surfaces to the position shown in FIGURE 2. The resilient bias of the fingers of the collet 31 tends to urge the sleeve 32 rearwardly and this urges the roller assemblies radially outward to the position of FIGURE 2.

It is desired that before the gland member 37 is moved forwardly to cause sealing engagement of the seal 42 with the ring 17 that the spindle be stopped in order to avoid frictional wear of the seal 42.

When it is desired to release the compressed air or fluid under pressure from chambers 51 a valve (not shown) controlling the passage of compressed air or fluid to the inlet 49 is turned to exhaust the compressed air or fluid from the rearward face of the gland member 37. This causes the gland member 37 to move rearwardly from its position shown in FIGURE 2 to its position shown in FIGURE 1. This in turn permits the compressed air or fluid in the chamber 51 to escape through the conduit 50 and to atmosphere out through the space 43 between the seal 42 and rear face of ring 17.

The present disclosure includes that contained in the following claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Collet mechanism comprising in combination a hollow collet having yieldably resilient fingers adapted upon compression to hold stock therein, a sleeve member disposed concentrically about said collet, said collet and sleeve member having opposed camming surfaces for actuating the collet upon axial movement of the sleeve member relative to the collet, a ring member disposed concentrically about said collet axially aligned with said sleeve member, a shell member disposed concentrically of the axis of said collet sleeve member and ring member, a toroidal shaped piston disposed in said shell member concentrically of said axis, yieldable resilient means carried by said shell member and positioned to exert resilient force on said piston, said resilient means being biased to resiliently urge said piston in one axial direction, conduit means carried by said shell member for introducing fluid under pressure into said shell member on a side of said piston to exert force on said piston to move the same in an opposite axial direction against the yieldable resistance of said resilient means, said sleeve member and ring member having opposed surfaces disposed in axially spaced planes transverse of said axis, said planes converging radially inwardly toward said axis, roller means carried by said shell member and disposed to engage said opposed surfaces and to move therebetween toward and away from said axis, camming means carried by said piston and disposed to engage said roller means to cammingly force said roller means toward said axis between said opposed surfaces under the resilient force of said resilient means urging said piston in said one axial direction, said roller means being permitted to move away from said axis upon movement of said camming means carried by the piston in said opposite axial direction, the said roller means upon being moved by said camming means toward said axis between said opposed surfaces forcing said sleeve member in said first axial direction to actuate said collet and upon being permitted to move away from said axis between said opposed surfaces allowing said sleeve member to move in said opposite axial direction to release said collet.

2. Collet mechanism as claimed in claim 1 and wherein said roller means includes a plurality of rollers journalled on a shaft and adjacent each other and independently rotatable on said shaft, and wherein said opposed surfaces of said ring member and sleeve member engageable by said roller means are disposed on opposite sides of a plane extending through the said axis and between said rollers whereby individual rollers journalled on a said shaft engage the surface of only one of the opposed surfaces of said ring member and sleeve member, respectively, to avoid the rolling of a roller against one of said surfaces in one rotative direction and the rolling of the same roller against the other of said surfaces of said opposed surfaces in an opposite rotative direction.

3. Collet mechanism as claimed in claim 2 and wherein said rollers of the roller means includes a middle roller of relatively large diameter and two end rollers of relatively small diameter all independently rotatable on said shaft, and wherein said opposed surfaces are disposed between and outwardly of planes passing through the said axis and between the said middle roller and the said two end rollers.

4. Collet mechanism as claimed in claim 1 and in which there are a plurality of roller means and associated opposed surfaces engageable thereby equidistantly spaced about said axis to distribute the force of said roller means on said sleeve member circumferentially around said sleeve member.

5. Collet mechanism as claimed in claim 4 and in which said yieldable resilient means includes a plurality of coil springs distributed circumferentially about said axis and arranged parallel to said axis to distribute the resilient force of said springs on said piston circumferentially around said axis.

6. Collet mechanism comprising in combination a shell-member, a collet carried by the shell member and concentric therewith, the collet having fingers for exerting a holding grasp on stock, a sleeve carried by the shell member concentrically of the collet and cooperable with the collet to cause the collet to move toward grasping position upon movement of the sleeve in a first axial direction and to move toward releasing position upon movement of the sleeve in an opposite axial direction, the sleeve being urged in said opposite axial direction by the resilient fingers of the collet upon release, a toroidal piston carred by the shell and movable axially thereof, said shell member providing a fluid-accommodating chamber on a side of said piston for the actuation of the same, resilient means carried by the shell member and positioned therein and biased to resiliently urge said piston in said opposite axial direction, said sleeve and shell member carrying cooperable wedging surfaces and said piston carrying camming surfaces, and roller means carried by said shell member in association with said wedging surfaces and camming surfaces, said surfaces being arranged to press said roller means in a wedging direction between said wedge surfaces to cause said sleeve to be wedgingly forced to move in said first axial direction by said camming surfaces carried by said piston upon the movement of the piston in said opposite axial direction under the resilient force of said resilient means, said piston being movable in said first axial direction against the resilient force of said resilient means upon admission of fluid under pressure into said chamber, the movement of said camming surfaces carried by said piston in said first axial direction permitting the said roller means to move in an unwedging direction between said wedge surfaces to allow the sleeve to move in said opposite axial direction under the urging of the resilient fingers of said collet.

7. Collet mechanism as claimed in claim 6 and in which said roller means and the camming and wedging surfaces associated therewith are substantially equidistantly distributed circumferentially around the collet, and the resilient means are a plurality of coil springs disposed parallel with the axis of the collet and substantially equidistantly distributed circumferentially around the collet.

8. Collet mechanism as claimed in claim 6 and in which said shell member includes a ring member carrying wedging surfaces inclined radially inward and forwardly toward wedging surfaces carried by an end of the sleeve and disposed in a plane substantially normal to the axis of the sleeve, and in which said camming surfaces carried by the piston slope in curves extending radially inward and forwardly toward said sleeve.

9. Collet mechanism as claimed in claim 6 and in which said roller means include rollers independently journalled on a shaft to permit rolling in opposite rotative directions, and in which the wedging surfaces and the rollers are dimensioned and positioned to permit one of the rollers of the said roller means to engage and roll in one rotative direction along one of the opposed wedging surfaces and to permit another of the rollers of said roller means to engage and roll in an opposite rotative direction along an opposite of the opposed wedging surfaces, whereby the roller means in moving between opposed wedging surfaces is not frictionally retarded by a roller moving along one of the opposed wedging surfaces contrary to the direction of its rolling action along an opposite of said opposed wedging surfaces.

10. Collet mechanism as claimed in claim 6 and in which said wedging direction is radially inward and said unwedging direction is radially outward, and in which said roller means move radially inward and forward in moving in said wedging direction and move radially outward and rearward in moving in said unwedging direction.

11. In a collet mechanism having a collet and collet-actuating sleeve having co-acting tapered surfaces, the combination of resilient means and mechanical-advantage means for moving in axial direction the collet-actuating sleeve of the mechanism to actuate the collet toward holding position, said mechanical-advantage means being axially spaced from the co-acting tapered surfaces of the collet and collet-actuating sleeve, the mechanical-advantage means cooperating with the resilient means to provide an action increasing the force exerted in said axial direction by the resilient means, and fluid-pressure means disposed to oppose the resilient means to permit the said collet-actuating sleeve to move in an axial direction for releasing the collet from holding position, the mechanical-advantage means cooperating with the resilient means to withdraw from said action upon the opposition of the resilient means by the fluid-pressure means.

12. The combination claimed in claim 11 and in which said mechanical-advantage means comprise wedging surfaces and roller means movable therebetween to move the said collet-actuating sleeve toward holding position under the force exerted on the roller means by said resilient means.

13. The combination claimed in claim 12 and in which said fluid-pressure means includes a piston movable in one axial direction by the resilient means and in an opposite axial direction by fluid-pressure, and which piston carries camming means for forcing said roller means between said wedging surfaces by the movement of the piston and camming means in said one axial direction.

14. In a collet mechanism having a shell member, an axially movable sleeve carried by the shell member for actuating a collet position concentrically in said shell member, a ring member carried by the shell member, the ring member and sleeve having spaced opposed surfaces, said surfaces being off-set from each other along planes extending axially of the shell member, said surfaces being inclined in planes converging radially inward, a roller device disposed to move between said surfaces to wedge the same apart as the roller device is moved radially inward to move said sleeve in a direction for actuating said collet toward stock-holding position, said roller device having a shaft and a plurality of adjacent rollers independently revolvable on said shaft, each of said rollers being positioned and dimensioned to engage only one of said surfaces to freely roll therealong, and camming means carried by said shell member and axially movable thereof, said camming means upon being axially moved in one axial direction cammingly engaging said roller device and moving the same radially inward between said opposed surfaces, movement of said camming means in an opposite axial direction permitting the roller device to move radially outward between said opposed surfaces to allow the sleeve to move in a direction for releasing said collet.

References Cited

UNITED STATES PATENTS

| | | | |
|---|---|---|---|
| 2,911,765 | 11/1959 | Studler | 279—4 X |
| 3,168,322 | 2/1965 | Dziedzic | 279—4 |
| 3,273,907 | 9/1966 | Voderberg | 279—50 X |

LESTER M. SWINGLE, *Primary Examiner.*

D. R. MELTON, *Assistant Examiner.*